United States Defensive Publication [19] (H) [11] T959,011
Smith [43] June 7, 1977

[54] TRANSPARENT HIGH-IMPACT POLYSTYRENE RESINS AND THEIR MANUFACTURE

[76] Inventor: Robert Clarence Smith, 1737 Hollywood St., Warren, Ohio 44483

[21] Appl. No.: 686,626

[22] Filed: May 14, 1976

Related U.S. Application Data

[63] Continuation of Ser. No. 558,039, March 13, 1975, abandoned, which is a continuation of Ser. No. 429,332, Dec. 28, 1973, abandoned.

[51] Int. Cl.[2] ..... C08L 53/00
[52] U.S. Cl. ..... 260/876 B; 260/892

[57] ABSTRACT

A transparent, high impact resin is produced by blending from 15 to 50 parts by weight of an impact modifier with from 85 to 50 parts by weight of clear crystal polystyrene. The impact modifier is a copolymer of a conjugated diene of from 4 to 6 carbon atoms and styrene, containing from 50 to 80 parts of styrene and from 20 to 50 parts of the conjugated diene. Further, the impact modifier consists of randomized copolymers or multiblock copolymers, and the polydiene blocks contained therein are of substantially 40,000 to 60,000 molecular weight. Higher molecular weights than 60,000 in the polydiene blocks give resins which are not transparent, while lower molecular weights than 40,000 give impact resistance which is lower than desired. Blending can be done in any convenient manner, either in solvent solution or otherwise. The transparent products can be used in packaging applications requiring varying thicknesses, from films to rigid molded or cast containers.

1 Claim, No Sheets Drawing,
18 Pages Specification

The file of this unexamined application may be inspected and copies thereof may be purchased (849 O.G. 1221, Apr. 9, 1968).